May 15, 1934.    W. D. ARCHEA    1,958,507
MILLING MACHINERY
Filed April 16, 1928    7 Sheets-Sheet 2

May 15, 1934.  W. D. ARCHEA  1,958,507
MILLING MACHINERY
Filed April 16, 1928   7 Sheets-Sheet 3

Inventor
WALTER D. ARCHEA.

By O. H. K. Parsons

Attorney

Patented May 15, 1934

1,958,507

UNITED STATES PATENT OFFICE 1,958,507

MILLING MACHINERY

Walter D. Archea, Cincinnati, Ohio, assignor to The Cincinnati Milling Machine Company, Cincinnati, Ohio, a corporation of Ohio Application April 16, 1928, Serial No. 270,218

22 Claims. (Cl. 90—21)

This invention relates to improvements in milling machines and has for its principal object the provision of a machine particularly adapted for the handling of large work pieces.

A further object of the present invention is the provision of improved control mechanisms for the several relatively adjustable or shiftable parts of the machine which shall particularly adapt same for the performance of contouring or other irregular operations and will facilitate the rapid production of either straight or irregularly milled work pieces thereon.

An additional object of the invention is the provision of a structure of maximum rigidity and freedom from chatter or vibration compatible with free relative universal movements of the parts.

Another object of the invention is the provision of a structure in which the several relative adjustments may be either manually or automatically accomplished and in which the rate of automatic or power driven relative movement may be instantly varied from feed rate during cutting operations to rapid traverse adjustment during non-cutting movements to reduce to a minimum the time required for a complete series of cutting operations on a given work piece.

Other objects and advantages of the present invention should be readily apparent by referring to the following specification taken in connection with accompanying drawings forming a part thereof in which one specific embodiment of the generic principles of the invention has been shown. It is to be understood however that I may make any modifications in the specific structural details hereinafter described within the scope of the appended claims without departing from or exceeding the spirit of the invention.

In the drawings in which similar characters of reference are employed to denote corresponding parts throughout the several views, the numeral 25 designates the main bed of the machine having the transversely extending supplemental hollow bed portion 26 formed on its upper face with the ways 27 for sliding table 28. Bed 25 is itself formed with ways 29 disposed at right angles to ways 27 for the table. Slideable on the ways 29 is the column 30 provided with vertical ways 31 at one side thereof on which moves the spindle carrier 32. It will thus be seen that the column has a forward and back movement as respects the table for general in and out relative positioning of the column and parts associated therewith; the table moves transversely or at right angles to the direction of movement of the column, thus carrying the work back and forth past the front face of the column while the spindle carrier bearing the milling cutter for operation upon work on the table is supported for in and out adjustment position as determined by the column and is capable of ready vertical adjustment as respects the table both by the manual and by the power actuated mechanisms hereinafter described.

Figure 1:
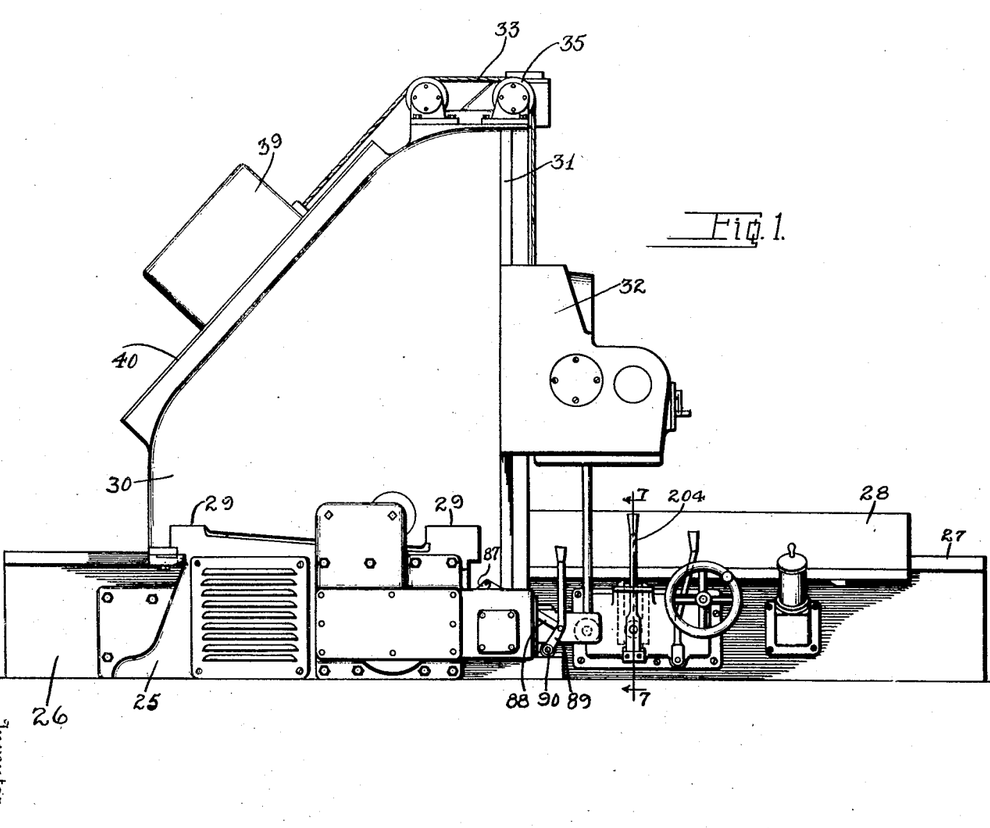
Figure 1 is a rear elevation of a milling machine constructed in accordance with the present invention.
Figure 2:
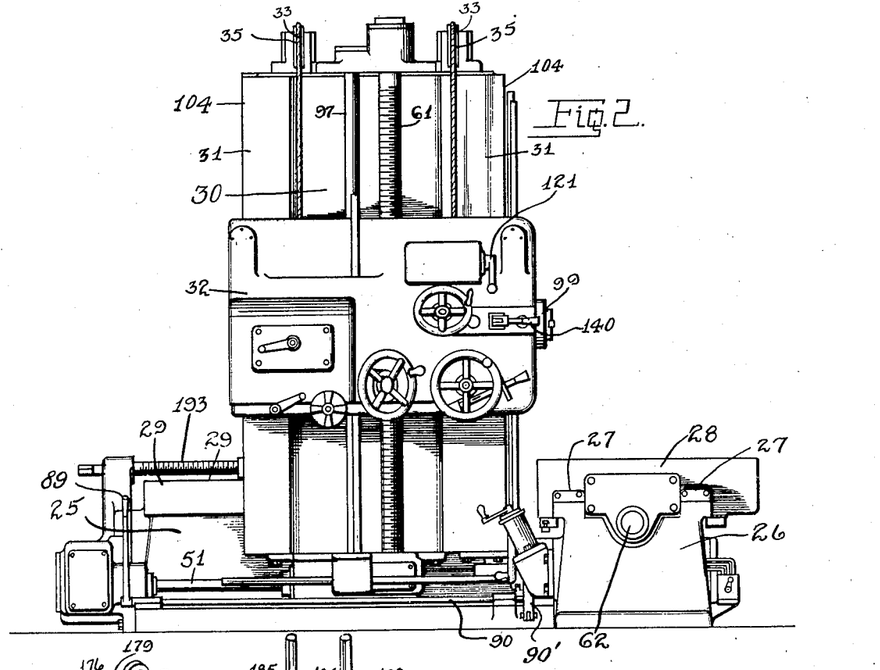
Figure 2 is a side elevation thereof.
Figures 3, 18:
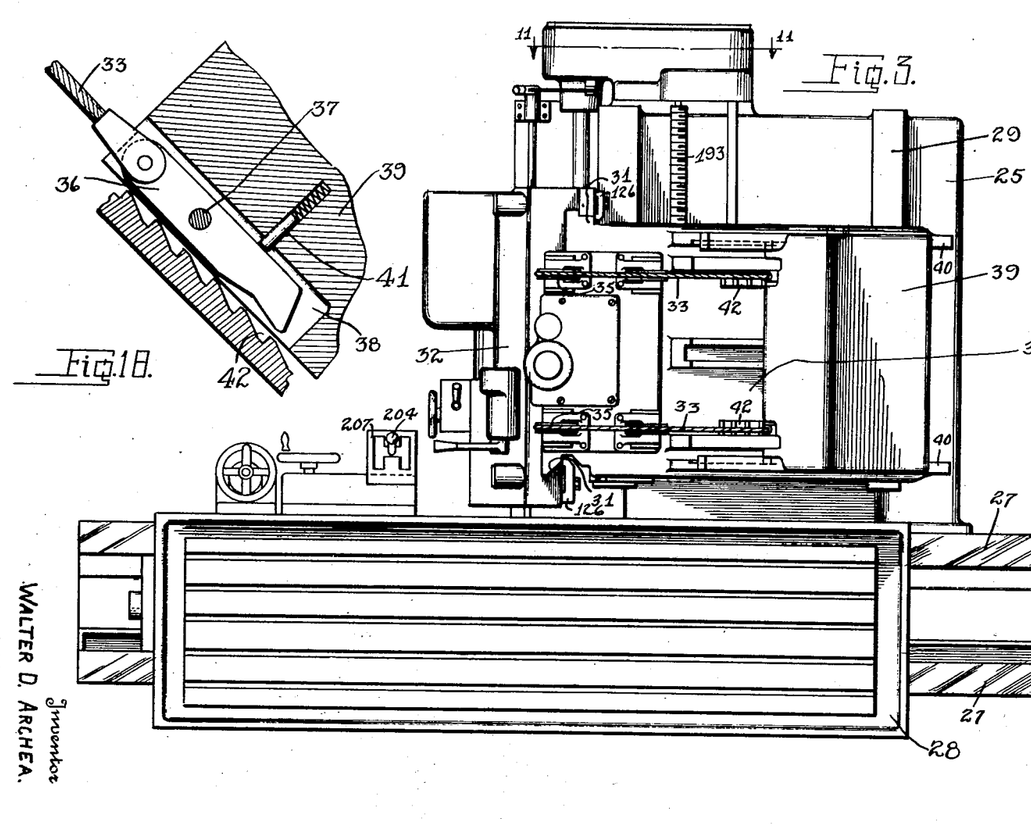
Figure 3 is a top plan view of same.
Figure 18 is a fragmentary section illustrating one of the safety dogs for the spindle carrier balance weight.

To facilitate the vertical adjustment of spindle carrier 32 in view of its considerable mass, use is made of cables 33 extending around the groove pulleys 35 on column 30 and having their opposite ends secured to lock pawls 36 pivoted as at 37 within the chambers 38 of balance weight 39. This weight rides on the angled ways 40, formed on the column 30, and serves as a counter-balance to a desired degree for the weight of spindle carrier 32 and its associated parts. Under ordinary conditions the pawls are held in position shown in Figure 18 by the tension of cables 33 thereagainst. Should the weight stick for any reason, however, when cables 33 are slackened by raising of the spindle carrier, or if one of the cables should part the loosened pawl 36 will then be forced by spring pressed plunger 41 into interlocking engagement with rack 42 on the diagonal portion on the column adjacent ways 40. This will prevent further downward movement of the counter-balance weight 39 until the pawl has been suitably released as by retensioning of its cable 33.

Figure 4:
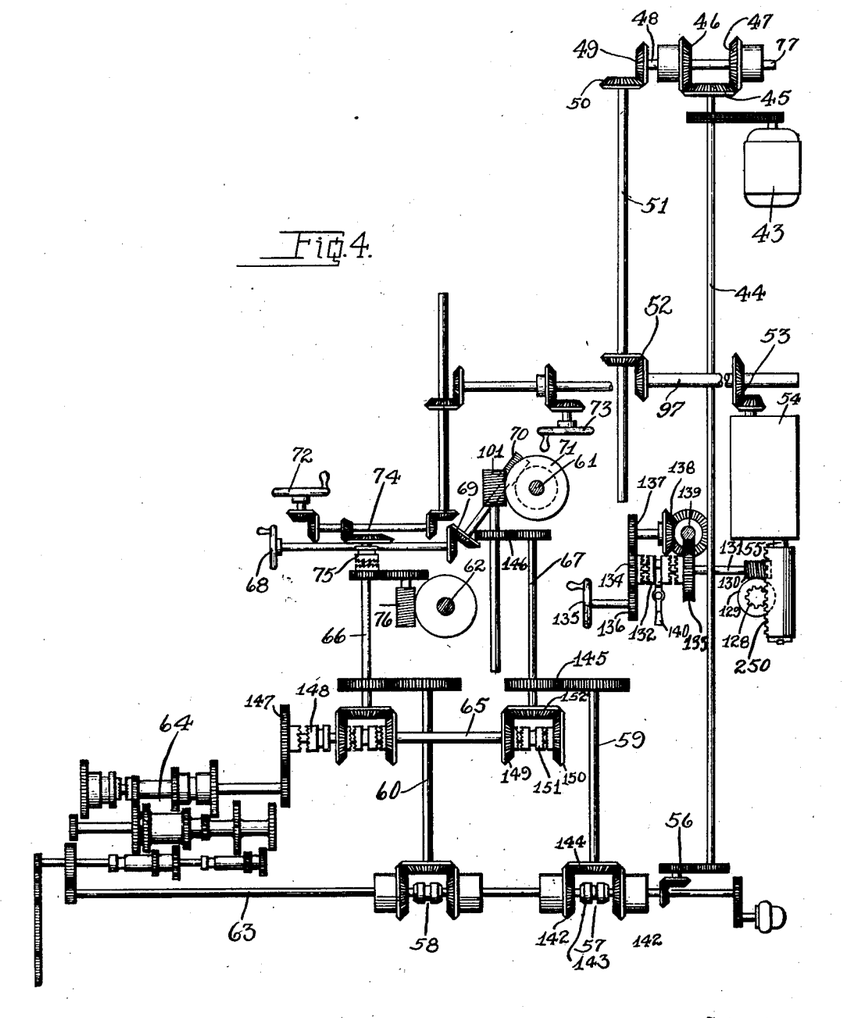
Figure 4 is a diagrammatic expanded development of the entire manually and automatic or power driven adjustment mechanism for the several parts of the machine.

To facilitate a general understanding of the several drive mechanisms and particularly adjustments of the present machine, description will first be given of the general expanded drive mechanism illustrated in Figure 4, and the details of certain of the specific units subsequently taken up in detail in connection with the several views particularly illustrating same. By reference to Figure 4 it will be noted that the entire drive is effected from a suitable prime mover such as the motor 43. This motor transmits its impulse to shaft 44 from which the power lines branch respectively to the spindle for actuation of the cutter and to the several adjusting mechanisms for the spindle and table.

The spindle drive mechanism includes the constantly driven bevel gear 45 and the pair of bevel gears 46 and 47 in constant mesh therewith. These gears are carried by shaft 48 and can be selectively coupled by hereinafter described mechanism to drive gear 49 in forward or reverse direction. Power is then transmitted through gear shaft 51 and direction changing sets of gears 52 and 53 to sliding gear transmission unit 54 by which the rate of rotation of spindle 55 is controlled.

In addition, transmission shaft 44 extends forwardly along the main bed of the machine to the supplementary or cross bed 26 which contains a plurality of gear box control units sliding gears, feed rate variators and the like for feed and quick traverse adjustments or shifting of the spindle carrier and work supporting table.

This power line mechanism in general comprises the transmission gearing 56 operatively coupling shafts 44 and 63. Shaft 63 carries the reverser structures 57 and 58 to impart to branch line transmission 59 and 60 rapid traverse movements respectively for the spindle carrier adjusting screw 61 and the table adjusting screw 62. In addition shaft 63 drives the feed box or feeding speed varying gearing 64 controlling transmission shaft 65 to actuate the branch transmission shafts 66 and 67 to the table feed screw 62 and spindle adjusting screw 61 respectively to suitable feed rates.

It will thus be seen that the general gearing transmission layout as here exemplified includes a prime mover, a branch transmission line leading from the prime mover to the spindle for operation thereof at variably selected speeds; a general power transmission line for the spindle and table movements having direct branch transmissions for rapid actuating of the table and spindle carrier respectively and in addition having a variable feed rate continuation transmission and independently controllable branch transmissions from the feed box to the table and spindle for independent actuation of said parts at feed rates which may be adjusted as desired but which will be corresponding in degree at any given adjustment.

It will further be observed that supplementing the several power actuations just referred to there is provided a hand wheel 68 operating through transmission gearing 69 and worm 70 to manually adjust spindle control nut 71. Also that by means of hand wheels 72 and 73 having the transmission line 74 terminating in selector clutch 75 said line may be coupled to worm 76 for manual actuation of screw 62 either from a position at the spindle carrier or at the side of the table.

That the structural elements of the various mechanisms described in connection with the diagrammatic development shown in Figure 4 may be better understood certain essential portions have been shown in detail and will now be described.

Figures 11, 12:
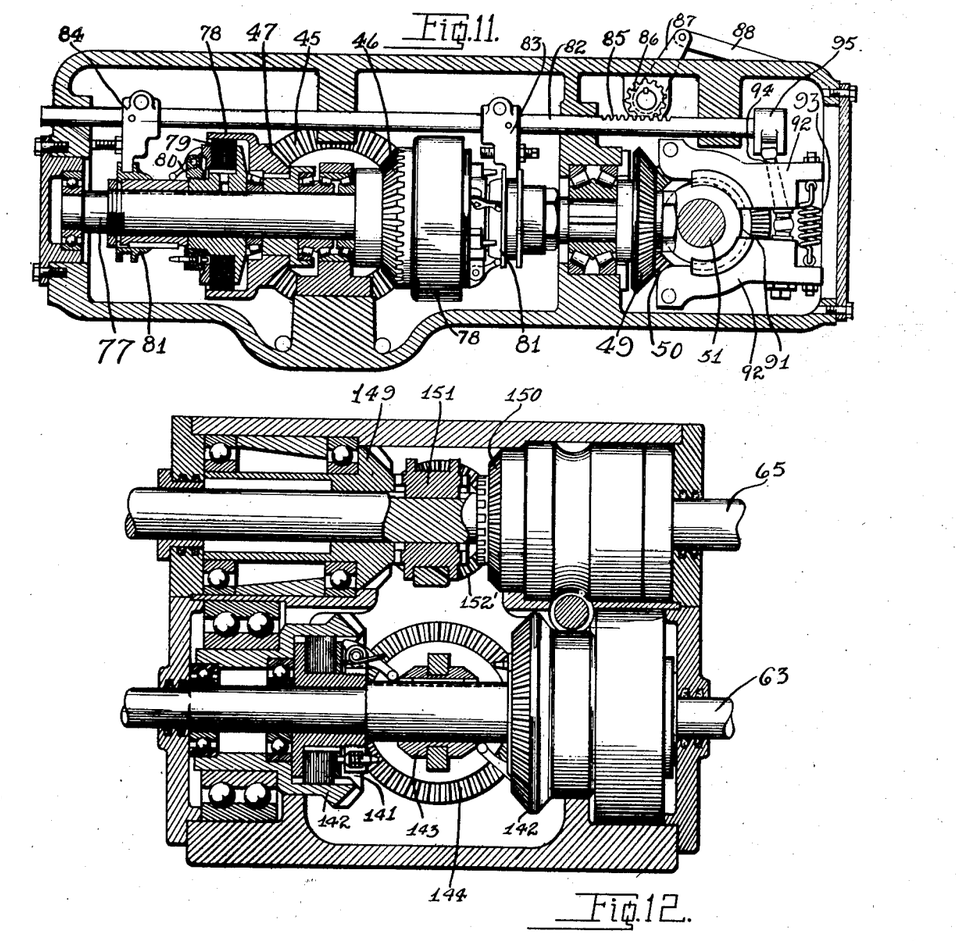
Figure 11 is a vertical section through the prime mover connections to the spindle as on line 11—11 of Figure 3.
Figure 12 is a vertical section through one of the gear box units as on line 12—12 of Figure 7.

Figure 11 is a section at the rear of the machine showing the shaft 77 having rotatably supported thereon by suitable antifriction bearings the gears 46 and 47 in mesh with drive gear 45 on the main drive shaft 44. Each of these gears is provided with a flanged hub 78 enclosing a suitable clutch 79 actuable as by clutch fingers 80 and clutch spools 81. It will be noted there are a pair of these spools 81, one for the member 46 and another for the member 47. Their operation is controlled by sliding rod 82 having fingers 83 and 84 respectively engaging the two spools and so located that on reciprocation of rod 82 both clutches may be disengaged or either selectively engaged while the other is in released position. This enables shaft 77 to be operated in either direction as may be desired. To effect this shifting of the rod 82 and thus to couple the desired gear with shaft 77 for actuation thereof rod 82 is formed with a rack portion 85 engaged by pinion 86 coupled with actuating arm 87. A link 88 extends from the arm to the starting clutch lever 89 on rock shaft 90. This shaft extends from the rear to the front of the machine where a second handle 90' is provided. This structure permits of operation of the spindle starting and stopping or control clutch from a position either at the rear of the machine or from the normal operator's position at the side of the table.

The power thus controlled is transmitted as previously described through bevel gears 49 and 50 to shaft 51. That rotation of the spindle may be most satisfactorily controlled and quickly stopped when desired shaft 51 is provided with a brake drum 91 engageable by the spring pressed brake shoes 92 inwardly actuated by spring 93. A brake release lever 94 is inter-engaged with yoke 95 on shift rod 82 in such manner as to release the brake when the rod is moved in either direction from its neutral position to cause engagement of one of the drive clutches while allowing application of the braking force whenever the parts are in neutral or non-driving relation.

Shaft 51 extends forwardly along the bed of the machine and serves through suitable position and direction changing gearing as indicated at 52 and 96 to drive the spline shaft 97 which in turn transmits its power through the bevel gears 53 to the speed change transmission set designated as an entirety by the numeral 98 from which spindle 99 ultimately derives its power.

As has been mentioned above the spindle is supported in a shiftable carrier 32 balanced by the counter-weight 39. Use of the spline shaft 97 permits sliding of the carrier with gears 53 relative the shaft so that the spindle is properly driven in any adjusted position. To effect the various vertical adjustments of the spindle there has been provided a combined power and manual adjustment mechanism in which adjustments for considerable distance may be readily affected at a suitable slow or fast rate by power and in which fine adjustments may be manually effected either independently or simultaneously with the power adjustment and with absolute safety in either event. This result is attained by employment of the rotatable adjusting screw 61 rigidly supported by the column 30 for rotation but held against axial movement. This screw passes through the carrier and is in threaded engagement with the rotatable sleeve 71 which is journaled in the spindle carrier and has the worm wheel 102 disposed between the anti-friction bearings 103. At its lower end the screw 61 is itself provided with a worm wheel 100 which meshes with the power driven worm 101 actuated by shaft 67.

It will thus be seen that power actuation serves to rotate the screw itself in its bearings within the sleeve nut 71 the nut being held stationary by the inter-locking therewith of worm 70. Manual adjustment of desired amount may be imparted to the carrier either independently of or simultaneously with the power adjustment through the medium of hand wheel 68 and worm 70 which causes a slow rotation of the sleeve nut itself, thus making it possible to secure very fine and accurate adjustments of the spindle carrier.

Figures 13, 14, 15, 16, 17:
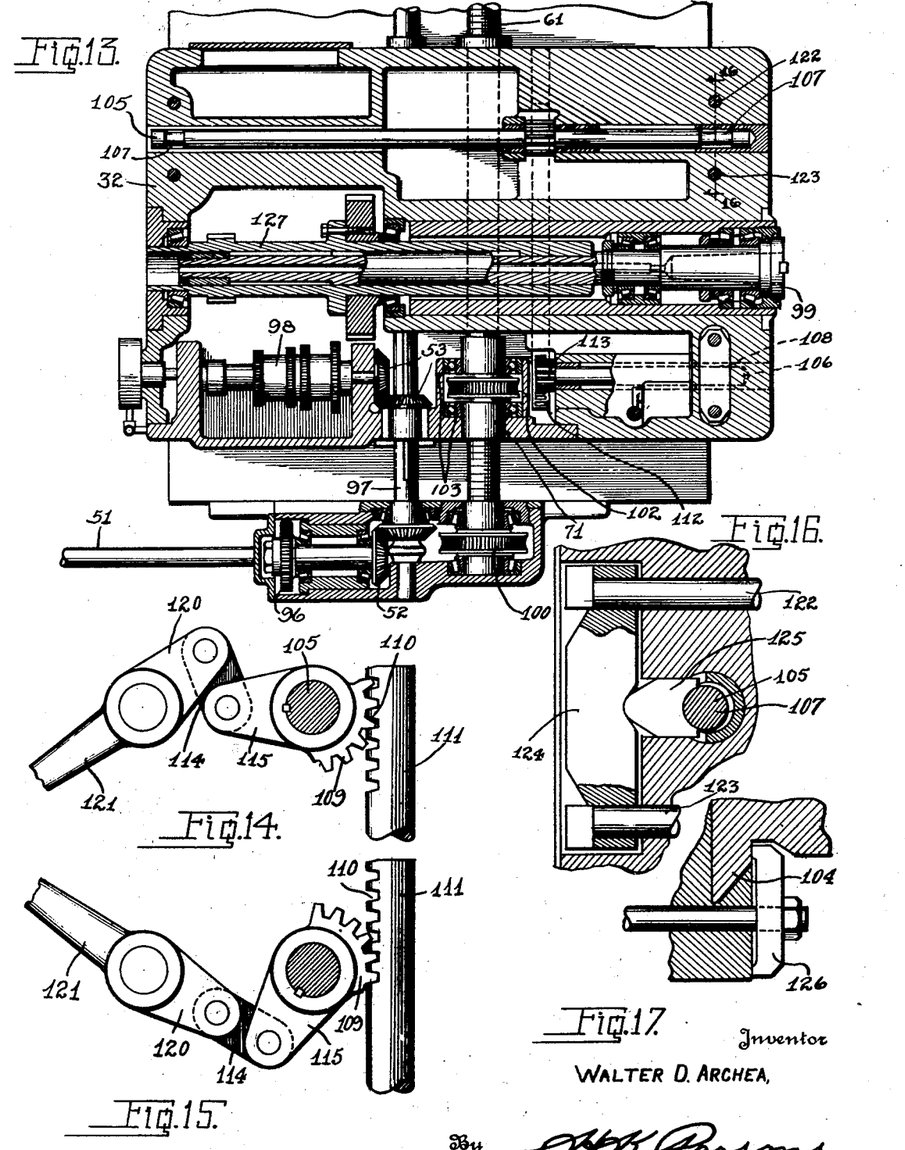
Figure 13 is a vertical section through the spindle carrier and elevating mechanism therefor.
Figures 14 and 15 are fragmentary views illustrating the toggle mechanism for actuation of the spindle carrier clamp.
Figure 16 is a fragmentary section illustrating the pressure cam and equalizer for the upper spindle clamps taken on line 16—16 of Figure 13.
Figure 17 is a fragmentary section of the operative clamp plate actuated throuh the cam and draw rod mechanism of Figure 16.

It will be noted that the column is provided as at 104 with dove tail ways on which the carrier moves, the carrier having suitable guide portions inter-locking with the ways. In order that the column and carrier may be rigidly connected in adjusted position and held against relative vibration or the like use may be made of the co-incidental clamping mechanism illustrated in Figures 13 to 17 inclusive. These members include the shaft 105 and shaft 106 provided with the respective eccentric or cam portions 107 and 108. Shaft 105 has mounted thereon a segmental rack member 109 meshing with rack 110 on operating rod 111 slidably supported by the carrier. This rod has a second rack portion as at 112 inter-engaged with a pinion located as at 113 on shaft 106 so that vertical movement of the rod 111 will correspondingly rock the two cross shafts 105 and 106. To impart said rocking movement use is made of suitable mechanism such as the link 114 having one end secured to rock arm 115 preferably integral with segment 109 and the other end connected to the stub arm 120 of rock lever 121 which thus serves to oscillate shaft 105. Series of corresponding clamping mechanism such as shown in Figures 16 and 17 are made use of. These each comprise the pair of equalizer rods 122 and 123 loosely engaging the equalizer bar 124. A pressure block 125 is slidably mounted in the carrier intermediate the eccentrics 107 and 108 and the respective equalizer bars as indicated in Figure 16. Consequently when the shafts 105 and 106 are oscillated their eccentric portions will push pressure blocks 125 outward exerting a pressure against the equalizer bar which will be evenly distributed to draw rods 122 and 123. These rods have on their opposite ends the clamps 126 having one edge bearing against the carrier and the opposite edge in a suitable groove adjacent the dove tail way 104. Consequently shifting movement of handle 121 serves selectively to positively clamp or release a spindle carrier for movement by a suitable adjusting mechanism.

Attention is additionally invited to the fact that the cutter spindle 99 is slidably mounted in the driven sleeve 127 so as to be capable of in and out movement for exact positioning of the cutter or cutter arbor. This in and out movement of the spindle as indicated in Figure 4 is accomplished through the medium of a rack 250 formed on the spindle quill and engaged by pinion 128 moveable as a unit with the worm gear 129 actuated by worm 130 on shaft 131. Carried by shaft 131 and keyed thereon is a clutch spool 132 while loosely supported co-axial with the shaft are the worm gear 133 and spur gear 134. The quill is intended for manual adjusting movement as by actuation of the hand wheel 135 which through pinion 136 rotates gear 134. When clutch spool 132 is coupled with gear 134 the drive is a direct one at a relatively rapid rate. When the clutch is shifted to disengage gear 134 and engage worm 133 to rotate with shaft 131 power is then supplied through second pinion 137 bevel gears 138 and worm 139 to the worm wheel with the result that a much slower or finer adjustment is attained. A suitable clutch shifting lever 140 on the face of the carrier adjacent hand wheel serves to control the position of clutch member 132.

In the interest of simplification of the drive units for the several parts these units have been provided as substantial duplicates so that a description of one should suffice for both. Extending along the front of the bed or parallel with the direction of movement of the table 28 is the main drive shaft 63. As shown in Figure 12 this shaft is provided with clutch members at at 141 enclosed within the body of the bevel gears 142. A clutch spool 143 slidably mounted on shaft 63 intermediate the gears serves to actuate either the right hand or left hand clutch members to correspondingly operatively connect its gear with shaft 63. Meshing with the head gears 142 is the common bevel gear 144 on shaft 59 which may consequently be driven in opposite directions from shaft 63, according to the actuation of clutch controlling spool 143 or the spool may be left in an intermediate or neutral position as shown in Figure 12 when no power will be transmitted to shaft 59. When shaft 59 is actuated power is transmitted therefrom through gearing 146 to worm 101 actuating worm gear 100 and rotating screw 61 to vertically adjust the spindle carrier at a rapid rate. Alternatively shaft 67 may be driven from shaft 63 through the medium of the feed change gearing 64 including a final driven gear 147 loosely mounted co-axial with shaft 65 and coupleable therewith as by clutch 148. This shaft has mounted thereon a plurality of feed control units for table spindle carrier or the like which also include the loosely mounted opposed bevel gears 149 and 150 with an intermediate double face clutch spool 151 keyed on shaft 65 and shiftable from a neutral central position to mesh with either of said bevel gears as desired to transmit rotation thereto from shaft 65. Said gears jointly mesh with the bevel gear 152' on shaft 67 and are therefore adapted to rotate said shaft in either direction as may be desired and thus transmit motion to the carrier shifting screw at a desired feeding rate.

From the description of the transmission mechanism just given it will be noted that shaft 67 is selectively rotatable by either the rapid traverse or high speed drive or by a slow feed drive as preferred. To safely effect this it is necessary that there be an interlocking device between the means for shifting clutch spool 143 and the means for shifting spool 151 so that one will always be in neutral position when the other is rendered operative. The structure for accomplishment of this result will be best understood by reference to Figures 7 to 10 inclusive of the drawings. On referring to these it will be noted that the shifter yoke 152 for clutch spool 143 is secured upon the end-wise movable supporting bar 153 while the shift yoke 154 for clutch member 151 is carried by the superimposed correspondingly shiftable bar 155.

Suitably supported by the bed of the machine for both oscillatory and longitudinal sliding movement is a control rod 156 bearing the shifter head 157. This head has a depending terminally rounded arm 158 selectively freely oscillatable in elongated slot 159 of rod 153 or engageable by forward movement in the notch 160 of said rod whereby said bar will be given a longitudinal sliding movement to correspondingly shift yoke 152 and clutch spool 143. Head 157 is further provided with a forwardly off set upwardly projecting shifter lug 161, shown in Figure 7 as engaged in the shifter notch 162 of bar 155 and forwardly movable to disengage said notch as member 158 is moved into notch 160. It will therefore be evident that rocking of shifter rod 156 will serve to impart a sliding movement to either bar 153 or bar 155 depending on the in and out or longitudinal adjustment which has been given said shifter rod. To prevent simultaneous shifting of said parts use is made of the safety lock out shown in Figures 9 to 10 comprising a U shaped plate 163 having a notch 164 through which lug 165 on the shifter head may pass when the head is in its central or neutral position. In other positions the projecting termini of the U plate inter-engage with lug 165 and prevent back and forth sliding movement of the shifter head. Consequently the head is entirely disengaged from the notch of one bar before it is in position where it may be oscillated to shift the other bar.

To hold the clutch members in adjusted position use is preferably made of the detent 166 actuated as by spring 167 and coupling with the cam or inclined face portions 168 of the shifter head. Likewise to prevent accidental shifting of the yoke members from neutral position the bars may be suitably notched as indicated at 169 for co-operation with an automatic spring actuated detent as shown at 170.

It will thus be seen that the single shifter head 157 serves to control the entire fast or rapid traverse and feed transmissions both as to selection of which will be employed and also as to direction of actuation of the part movable thereby and desired reversal of operation. It will also be noted that due to the safety device and lock out provided on the head 157 it can only be given a back and forth movement for selective engagement with either the feed or quick traverse clutch control mechanism when the parts are in neutral or inoperative position so that there is no possibility of simultaneous clutching of the two transmissions.

Figures 5, 6:
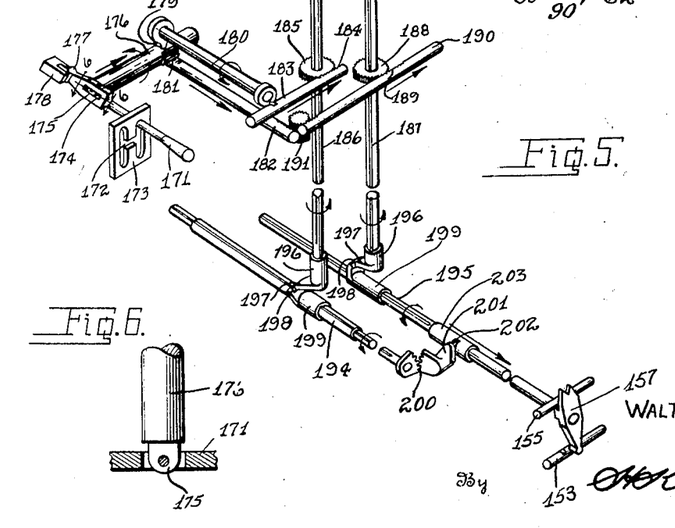
Figure 5 is a perspective view of the control mechanism for regulating from the spindle carrier, the rate and drive imparted thereto from the drive control device in the bed of the machine.
Figure 6 is a fragmentary section on the line 6—6 of Figure 5.
Figure 7:
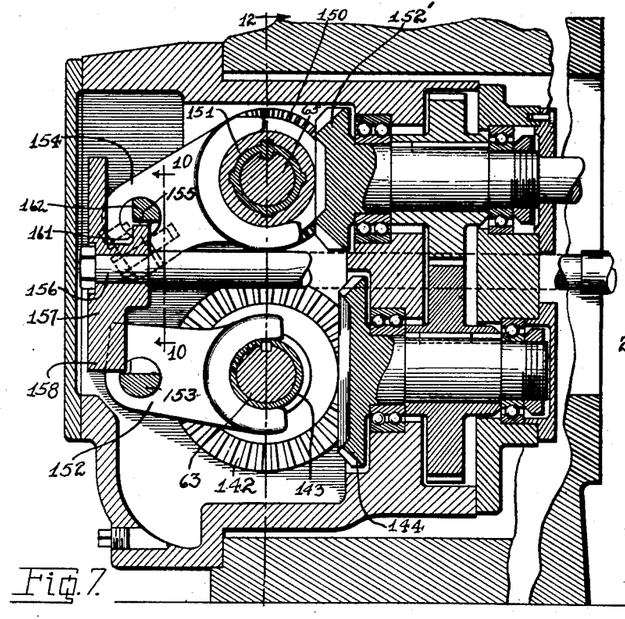
Figure 7 is a vertical section as on line 7—7 of Figure 1 illustrating the control mechanism contained in one of the gear box units carried by the bed.
Figure 8:
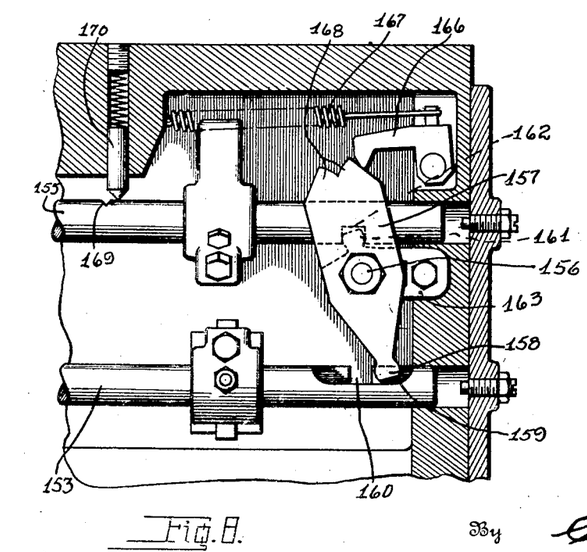
Figure 8 is a view from the front of one of the inter-lock clutch shifting mechanisms of a gear box unit such as shown in Figure 7.
Figure 9:
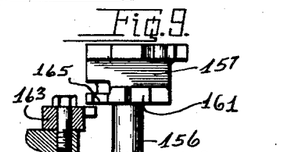
Figure 9 is a fragmentary view particularly in section of one of the lock out devices.
Figure 10:
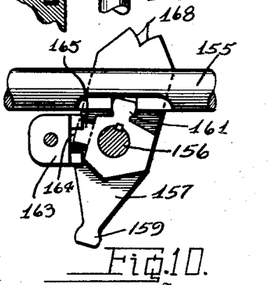
Figure 10 is a fragmentary section as on lines 10—10 of Figure 7.

As it is desirable that the movement of the spindle carrier be controlled by the operator at the carrier itself where he can carefully observe the adjustments being effected and the relationship between cutter and work during setting up or during the cutting operation a suitable control mechanism has been provided for transmitting the oscillatory and reciprocatory movements to head 157 from the operating lever on the carrier. This mechanism is illustrated in Figure 5 and comprises a shift lever 171 working in the H slot 172 of guide plate 173. This lever has a slot 174 pivotally receiving the ear 175 on the end of shifter rod 176 which is suitably rotatably supported by the carrier. The lever is further formed with fulcrum extension 177 inter-engaged with the fulcrum yoke 178 of the carrier. This construction is such that the lever may be laterally swung transversely of the H slot about 177 as a fulcrum and in this movement it will axially shift rod 176. Additionally it may be given an oscillatory movement about the pivotal support of member 176 thus rotating that member. Axial movement of rod 176 serves through the interlocking slot and lug connection 179 to rotate rod 180, while rotative movement of member 176 serves through the rack and pinion connection 181 to shift rod 182 longitudinally. The rotative movement of rod 180 is transformed into rectilinear movement of connection 183 which has a rack 184 inter-engaged with pinion 185 on spline shaft 186. This spline shaft is journaled at its lower end in the base or bed of the machine and at its upper end in the carrier and has the pinion 185 slidably but non-rotatably supported thereon so that satisfactory rotative movement may be transmitted to the spline shaft on lateral swinging of lever 171 to control the selection of feed or quick traverse rates. Disposed adjacent spline shaft 186 is a second spline shaft 187 having slidable thereon the pinion 188 which through rack 189 on shift rod 190, intermediate pinion 191 and rod 182 receives rotary movement upon rocking the lever about member 176 as a pivot thus affecting the direction in which the carrier will be actuated. While pinions 185 and 188 are vertically slidable on their respective spline shafts due to the fact that they drive with the carrier, the spline shafts themselves are in turn given a back and forth movement with respect to the bed 25 due to adjustment of the column on its horizontal ways 29 through the medium of screw 193. To permit of this adjustment without affecting the transmission of the effective movements of lever 171 on the carrier to the clutch shifter mechanism in the bed, use is made of the spline shafts 194 and 195 which are coupled respectively with spline shafts 186 and 187 by corresponding means. These comprise sleeves 196 on the lower end of the vertical spline shafts having the rack segments 197 meshing with segments 198 on sleeves 199 which are slidably but nonrotatably mounted upon their respective horizontal spline shafts. As a result the sleeves will be carried back and forth without longitudinal shifting of their respective shafts but are imparted for rotative movements thereof. To interpret these, shaft 195 may be connected direct to head 157 as indicated in Figure 5 for determination of direction of feed or quick traverse while shaft 194 is connected through the medium of rack sectors 200 and stub rocker 201 and rock arm 202 with enlargement 203 on shaft 195 to vary the in and out position of head 157 and thus selectively determine whether the directional variation is made in feed or in quick traverse.

Inasmuch as the unit 58 is in all essential respects identical with unit 57 and the feed rate directional control is also similar it is believed unnecessary to enter into a detail description thereof. The units in fact are designed as duplicates which may be readily mounted side by side in the proper receiving recess in the bed. The method of operation is the same in both cases with the exception that the control lever 204 for rate and direction of movement of the table is located immediately adjacent the table. Consequently the lever may be connected direct with the gear shifting mechanism without interposition of spline shafts and like mechanisms as indicated in Figure 5. In this event the lever is pivoted within yoke 205 on control rod 206 which takes the place of shaft 195, oscillation of the lever about member 206 has a pivot within the guide slots of H plate 207 serving as before described to oscillate the clutch control head and thus vary the direction of movement of the part actuated. During this movement lug 208 of bracket 209 carried by the bed of the machine slides idly in slots 210 at the lower end of the lever. When the lever is brought to a central position in the H slot it may be moved forward or back about lug 208 as a fulcrum imparting an in and out movement to rod 206 and thus to the clutch control head for selection of feed or quick traverse as may be desired.

Figure 19:
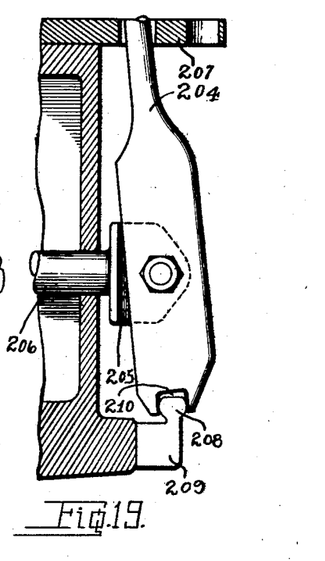
Figure 19 is a fragmentary section of the table control lever and mounting therefore adapted for actuation of a gear box unit such as shown in Figure 7.

To facilitate clear understanding of this situation the lever and associate parts have been shown in Figure 19 in the relationship they normally occupy to the other parts and may be interpreted as though shaft 195 were a direct continuation of shift rod 206.

From this portion of the description it will be seen that the present machine provides a plurality of substantially identical inter-changeable control units for various movements of a machine tool organization which units may be readily mounted as an entirety within a machine and which have associated therewith control mechanisms including directionally shiftable levers and inter-engaged mechanisms movable in a given direction to produce a corresponding directional movement of the part controlled thereby.

It will further be noted that in mechanism aforesaid the controls are disposed immediately adjacent the parts operated thereby.

Further attention is invited to the fact that by the present invention it is possible to employ a single main drive shaft such as the shaft 63 with branch transmissions leading directly therefrom for individual power actuation of a plurality of distinct parts and in addition to utilize a feed change mechanism or transmission as a continuation of said main transmission so cut back that it may be selectively coupled with one or more of the initial branch transmissions to impart a directly controlled feeding rate thereto. It will further be noted that each unit is a complete entity in itself to the extent that a single directionally operated lever functions to determine the ouput of unit, whether a feed or a quick traverse rate and also to determine the direction which is constant for a given direction movement of the lever.

It will further be noted in conjunction with the shifting of the carrier that the carrier itself is mounted for vertical movement on its supporting column and for horizontal movement with said column but that the control for the vertical movement is disposed on the carrier immediately adjacent the tool holding and operating mechanism where the operator can most satisfactorily utilize same but that said device provides a remote control mechanism in that the parts operated thereby are disposed in the bed coupled with the main source of power for the machine whereby a simple and efficient drive is accomplished coupled with a maximum ease and efficiency of operation.

What is claimed is:

1. A machine tool of the character described comprising a bed, a column rising from the bed, a translatable unit supported by the column, drive means in the bed for imparting movement to said unit at variable rates and in variable directions, and a single control mechanism carried by the unit for movement therewith and shiftable relative to the unit to vary the rate and direction of rotation of the drive means in the bed and thus the movement of the unit in lieu thereof.

2. A machine tool of the nature described including a bed, a column, translatable unit carried by the column, a single means for imparting movement to the unit, drive mechanism in the bed actuating said means at different rates and in different directions, a control device carried by the unit and movable in angularly related directions, and a mechanism coupling the control with the drive mechanism in the bed for selectively operatively associating the drive mechanism with the unit shifting means.

3. A machine tool of the character described including a bed portion, a column mounted for movement on the bed, a shiftable unit mounted on the column for movement therewith and relative thereto, means on the bed for power adjustment of the unit, and a control mechanism for the power adjusting means including a single actuator carried by the unit and an interpreting mechanism therefor including angularly related spline shaft members and couplings keyed thereto whereby the operation of the interpreting mechanism is unaffected by adjustments of the column and unit.

4. A machine tool of the nature described including a plurality of relatively shiftable units, individual final drives for said units, a prime mover, a main transmission line unidirectionally actuated thereby, branch transmission lines extending therefrom to the individual unit final drive means, a feed varying speed reducing transmission in series with main transmission line, an ultimate feed transmission line extending therefrom in juxtaposition to the individual unit drive transmissions, and individual control members for the units for selectively coupling their branch line transmissions with said main transmission line or with the ultimate feed transmission, and for actuation thereby in a forward or reverse direction.

5. A machine tool of the nature described including a plurality of relatively shiftable units, individual final drives for said units, a prime mover, a main transmission line unidirectionally operated thereby, branch transmission lines extending therefrom to the individual unit final drive means, a feed varying speed reducing transmission in series with main transmission line, an ultimate feed transmission line extending therefrom in juxtaposition to the individual unit drive transmissions, individual control members for the units for selectively coupling their branch line transmissions with said main transmission line or with the ultimate feed transmission for actuation in a forward or reverse direction at rapid traverse or feed rate, and supplemental manually actuable instrumentalities for imparting movement to the units independent of the power actuation therefor.

6. A rate and direction controlling transmission mechanism for a machine tool including a prime mover, a transmission shaft operated thereby, a pair of opposed bevel gears loosely mounted on the transmission shaft, a single bevel gear in joint mesh with the pair, a branch transmission line actuable by said gear, a second juxtaposition pair of bevel gears adjacent the first, a driven shaft supporting said gears, a bevel gear jointly meshing therewith and coupled with the branch transmission, a feed rate transmission driven by the first mentioned shaft and ultimately imparting movement to the driven shaft, and a single means for selectively coupling any one of the aforementioned bevel gears with its shaft, whereby the branch transmission is operated at a rate and in a direction determined thereby.

7. A rate and direction controlling transmission mechanism for a machine tool including a prime mover, a transmission shaft operated thereby, a pair of opposed bevel gears loosely mounted on the transmission shaft, a single bevel gear in joint mesh with the pair, a branch transmission line actuable by said gear, a second juxtaposition pair of bevel gears adjacent the first, a driven shaft supporting said gears, a bevel gear jointly meshing therewith and coupled with the branch transmission, a feed rate transmission driven by the first mentioned shaft and ultimately imparting movement to the driven shaft, means for selectively coupling either of the first mentioned pair of bevel gears with its shaft, means for selectively coupling either of the second pair of bevel gears with their shaft, and a single control device for said several coupling means.

8. A rate and direction controlling transmission mechanism for a machine tool including a prime mover, a transmission shaft operated thereby, a pair of opposed bevel gears loosely mounted on the transmission shaft, a single bevel gear in joint mesh with the pair, a branch transmission line actuable by said gear, a second juxtaposition pair of bevel gears adjacent the first, a driven shaft supporting said gears, a bevel gear jointly meshing therewith and coupled with the branch transmission, a feed rate transmission driven by the first mentioned shaft and ultimately imparting movement to the driven shaft, means for selectively coupling either of the first mentioned pair of bevel gears with its shaft, means for selectively coupling either of the second pair of bevel gears with their shaft, and a single control device for said several coupling means, and lock out mechanism preventing simultaneous operative connection of gears of the first and second pairs.

9. A rate and direction controlling transmission mechanism for a machine tool including a prime mover, a transmission shaft operated thereby, a pair of opposed bevel gears loosely mounted on the transmission shaft, a single bevel gear in joint mesh with the pair, a branch transmission line actuable by said gear, a second juxtaposition pair of bevel gears adjacent the first, a driven shaft supporting said gears, a bevel gear jointly meshing therewith and coupled with the branch transmission, a feed rate transmission driven by the first mentioned shaft and ultimately imparting movement to the driven shaft, means for individually coupling a gear of either pair to its shaft, said means including slidably supported shift yokes for each pair, and a rotatable bodily shiftable member for selectively actuating the yokes.

10. A rate and direction controlling transmission mechanism for a machine tool including a prime mover, a transmission shaft operated thereby, a pair of opposed bevel gears loosely mounted on the transmission shaft, a single bevel gear in joint mesh with the pair, a branch transmission line actuable by said gear, a second juxtaposition pair of bevel gears adjacent the first, a driven shaft supporting said gears, a bevel gear jointly meshing therewith and coupled with the branch transmission, a feed rate transmission driven by the first mentioned shaft and ultimately imparting movement to the driven shaft, means for individually coupling a gear of either pair to its shaft, said means including slidably supported shift yokes for each pair, a rotatable bodily shiftable member for selectively actuating the yokes, a single control and means coupling the control with the member for suitable actuation thereof.

11. A rate and direction controlling transmission mechanism for a machine tool including a prime mover, a transmission shaft operated thereby, a pair of opposed bevel gears loosely mounted on the transmission shaft, a single bevel gear in joint mesh with the pair, a branch transmission line actuable by said gear, a second juxtaposition pair of bevel gears adjacent the first, a driven shaft supporting said gears, a bevel gear jointly meshing therewith and coupled with the branch transmission, a feed rate transmission driven by the first mentioned shaft and ultimately imparting movement to the driven shaft, means for individually coupling a gear of either pair to its shaft, said means including slidably supported shift yokes for each pair, a rotatable bodily shiftable member for selectively actuating the yokes, a single control, means coupling the control with the member for suitable actuation thereof, said member having a projecting lug, and means cooperating with the lug for preventing bodily movement of the member when rotatably adjusted.

12. A milling machine including a bed, a column rising therefrom, a spindle carrier vertically movable on the column, a drive mechanism in the bed, means extending therefrom for shifting the carrier, a single control member disposed within the bed for varying the drive means to control the rate and direction of actuation of the carrier, a single control member carried by and movable with the carrier, and interpreting mechanism including a pair of parallel transmissions for transmitting movement from the single control member on the carrier to the single control member on the bed for controlling the actuation of the carrier.

13. A milling machine including a bed, a column rising therefrom, a unit movably supported by the column, a pair of transmissions in the bed for imparting distinct movements to the unit, a single lever carried by the unit and movable therewith, a single shifter carried by the bed for controlling the operative association of the pair of transmissions with the unit shifting means, individual control transmissions extending from the unit to the bed, a joint actuator for the transmissions coupled with the lever and means reuniting the transmissions with the shifter in the bed for variably moving the latter to control the acting forces imparted to the unit.

14. A milling machine including a fixed bed, a table mounted for reciproaction relative to the bed, means for reciproacting the table, a cutter spindle, means for effecting relative adjustment between said spindle and table, a prime mover, a main transmission unidirectionally actuated thereby, a supplemental feed transmission in series with the main transmission, and unidirectionally actuated thereby, means including a pair of reverse clutches arranged in parallel for selectively coupling the table with either transmission for actuation at variable rates and in opposed directions, and additional means including a second pair of reverser clutches arranged in parallel for selectively coupling the spindle with either transmission for actuation at variable rates and in opposed directions.

15. A milling machine of the character described, the combination of a column having parallel guides, a spindle carrier vertically movable thereon, a pair of upper clamping mechanisms disposed adjacent to each one of said guides, a pair of lower clamping mechanisms also disposed adjacent to each of said guides for securing the carrier in adjusted position on the column, equalizers for each pair of clamping mechanisms, and a single actuating means effective on said equalizers for simultaneously operating said clamping mechanisms.

16. A milling machine of the character described the combination of a column having parallel guides, a spindle carrier vertically movable thereon, a pair of upper clamping mechanisms disposed adjacent to each one of said guides, a pair of lower clamping mechanisms also disposed adjacent to each guide for securing the carrier in adjusted position on the column, equalizers for each pair of clamping mechanisms, a single actuating means effective on said equalizers for simultaneously operating the clamping mechanisms, and means for individually adjusting the effective pressure of the equalizers to adjust the clamping pressure of the several mechanisms.

17. In a milling machine the combination with a support, of a table, a spindle carrier having a cutter spindle journaled therein mounted on the support, means for reciprocating the table, means for effecting relative adjustment between the spindle and table, a main high speed transmission and a supplementary low speed transmission disposed in series, a pair of reversing clutches for selectively coupling either the high or low speed transmission with the table reciprocating means, an additional pair of reversing clutches for similarly coupling the high or low speed transmission with the means for relative adjustment between carrier and table, a single control lever for the first pair of clutches, and an additional control lever for the second pair of clutches.

18. A milling machine including a bed portion, a table mounted for reciprocation upon the bed, a spindle carrier having a cutter spindle journaled therein supported by the bed for movement toward and from the table, a power transmission mechanism for imparting movement to the table and to the spindle carrier including a prime mover, a high speed transmission operated thereby, a feed transmission operatively coupled in series with the high speed transmission for actuation thereby, individual branch transmissions to the table and carrier, a pair of reversing clutches for selectively coupling one branch transmission with either the high or low speed transmission for determining the rate and direction of movement of the carrier, a second pair of reversing clutches for coupling the other branch transmission with the high or low speed transmission for determining the rate and direction of movement of the table, individual control levers for said pairs of clutches, one of said levers being mounted on the bed adjacent one moving member and the other lever mounted on the remaining member for movement therewith.

19. A milling machine having a bed or support, a table mounted for reciprocation thereon, a spindle carrier supported thereby for movement toward and from the table, a power transmission mechanism for imparting movements to the table and spindle carrier including a prime mover, a high speed transmission irreversibly driven thereby, a feed transmission in series with the high speed transmission for actuation thereby, a branch transmission extending to the table, a second branch transmission extending to the carrier, a first pair of reversing clutches for coupling the table transmission with the speed and feed transmissions, a second pair of clutches for coupling the carrier transmission with the speed and feed transmissions, single control levers for each pair of clutches one of said control levers being mounted on the member controlled thereby and the other lever on the fixed support adjacent the remaining movable member, dual manually actuable means for translating one of said members when its control clutches are in a neutral position, and additional manually actuable means for translating the other support when its control clutches are in a neutral position.

20. A milling machine comprising a bed portion, a work table reciprocably mounted thereon, a column member mounted on the bed portion for adjustment relative to the table, a spindle carrier mounted on the column for vertical adjustment relative to the table, a cutter spindle journaled in said carrier, a power transmission mechanism for actuating said parts including a prime mover, a main drive shaft actuated thereby, a high speed and a low speed transmission serially connected with the drive shaft for unidirectional actuation thereby, a spindle transmission including a speed change mechanism, means to couple the spindle transmission with the main drive shaft for selective operation thereby in opposite directions, parallel transmissions extending to the table and spindle carrier, reverser clutch mechanism for selectively coupling the table transmission to either the high or low speed transmission and for determining the rate and direction of movement thereof, a second reverser clutch mechanism for selectively coupling the spindle carrier to the high or low transmission for determining the rate and direction of movement thereof, individual control levers for each of said clutch mechanisms and manual means for actuating each of said supports when said clutch mechanisms are in a neutral position.

21. A milling machine comprising a bed, horizontal guideways formed on a portion of said bed, a work table reciprocably mounted on said guideways, a column, a spindle carrier mounted on the column for adjustment toward and from the table, a power transmission mounted in the bed including a rapid traverse mechanism and a feed mechanism arranged in series, a final shaft extending to the table, a pair of clutches for selectively coupling the final shaft to the feed mechanism or rapid traverse mechanism, a single control lever for said clutches mounted on the bed, a manually actuable member, a clutch for selectively coupling said member to the final shaft, a hand wheel mounted on the carrier, a second hand wheel mounted on the bed, and means inter-connecting said hand wheels with the manually actuable member whereby the table may be controlled from a position adjacent the carrier or a position adjacent the bed.

22. A milling machine comprising a bed, horizontal guideways formed on a portion of said bed, a work table reciprocably mounted on said guideways, a second pair of guideways formed on another portion of said bed at right angles to the first named guideways, a vertical column member mounted on the second pair of guideways for adjustment toward and from the table, a manually actuated screw for effecting column adjustment, guideways formed on one side of said column member and lying in a plane which intersects the table at right angles to the surface thereof, a spindle carrier mounted on the column guideway for movement toward and from the work supporting surface of the table, a cutter spindle journaled in the carrier parallel to the surface of the table, a quill for supporting the spindle in the carrier, means for longitudinally adjusting the quill and thereby the spindle toward and from the table whereby maximum adjustments to the spindle may be imparted by the lead screw and incremental adjustments may be imparted by the quill, a counterweight for said carrier including diagonal guideways formed on the side of the column opposite to the guideways thereon, a counterweight slidably mounted on the diagonal guides, a flexible cable extending over the top of the column for coupling the carrier to the counterweight, saw teeth formed on the column between the counterweight guides, a pivoted latch member carried by the counterweight, means to couple the cable to one end of said latch member to maintain the same normally out of engagement with said teeth, and resiliently operable means for effecting engagement of the latch member with the teeth upon parting of said cable to prevent dropping of the counterweight.

WALTER D. ARCHEA.